Oct. 23, 1956   R. L. NOLAND ET AL   2,767,436
METHODS OF FORMING SMOOTH SURFACES ON THERMOPLASTIC SPONGE
Filed Aug. 25, 1952    2 Sheets-Sheet 1
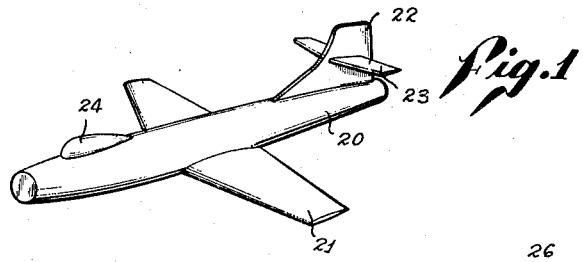
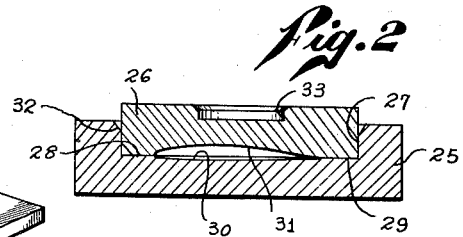
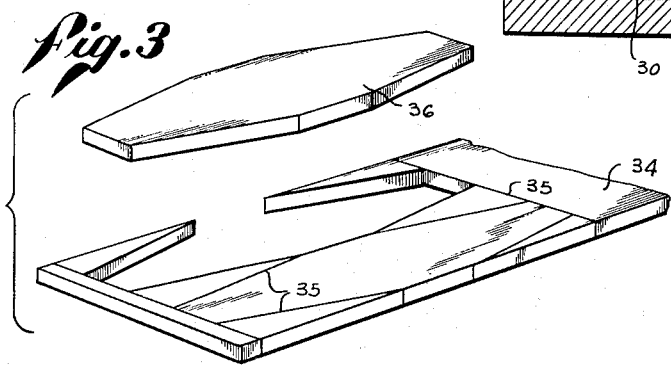
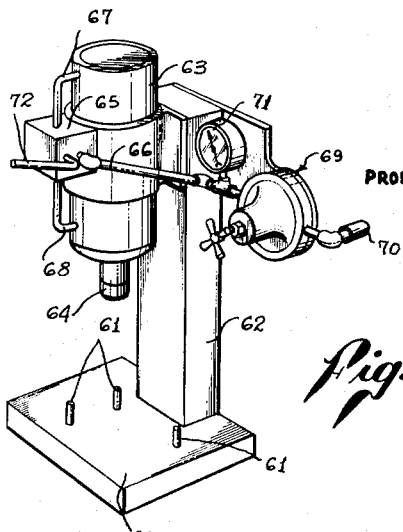
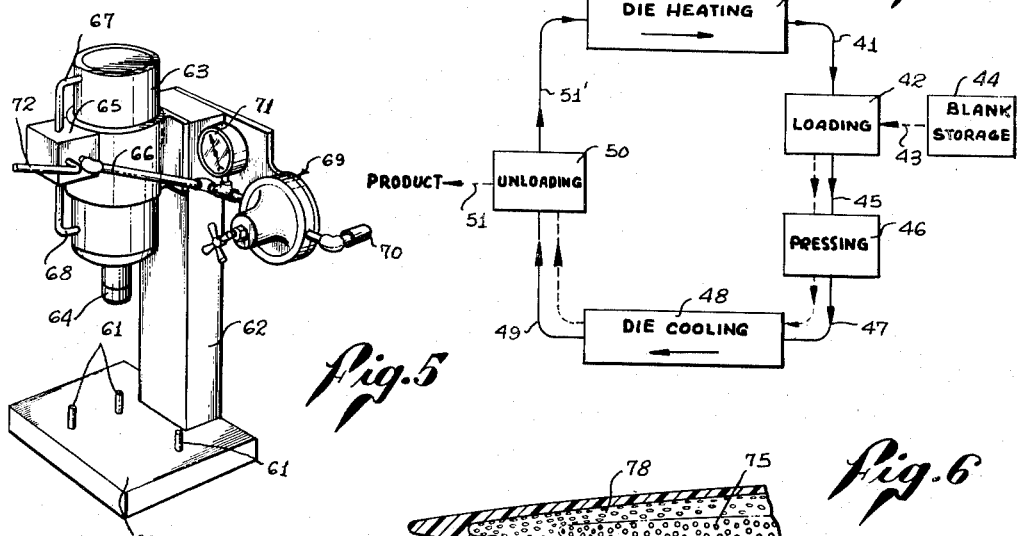
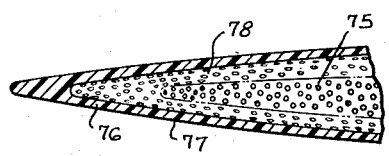
INVENTORS
ROBERT L. NOLAND
VICTOR M. SANDERS
BY
Attorneys Oct. 23, 1956  R. L. NOLAND ET AL  2,767,436
METHODS OF FORMING SMOOTH SURFACES ON THERMOPLASTIC SPONGE
Filed Aug. 25, 1952  2 Sheets-Sheet 2
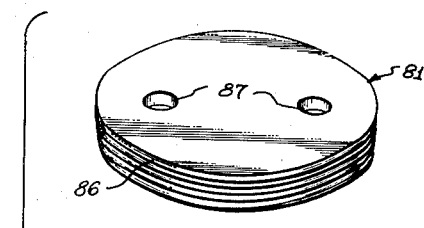
Fig. 7
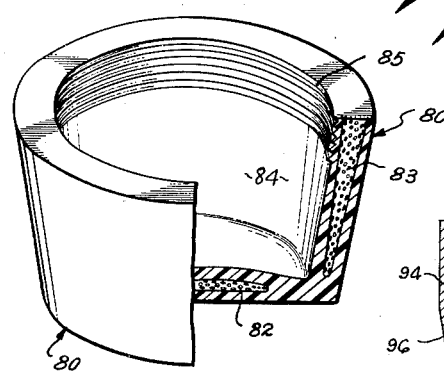
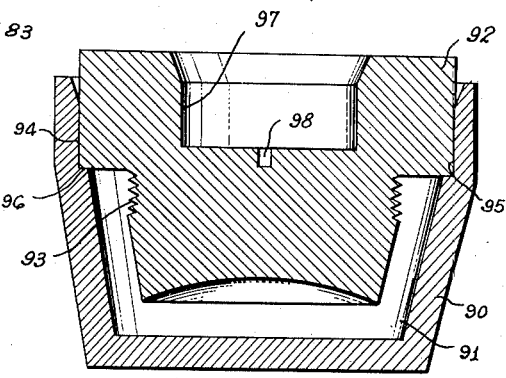
Fig. 8
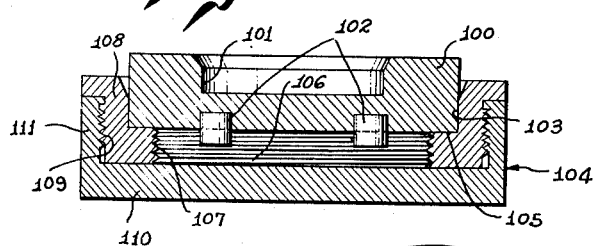
Fig. 9
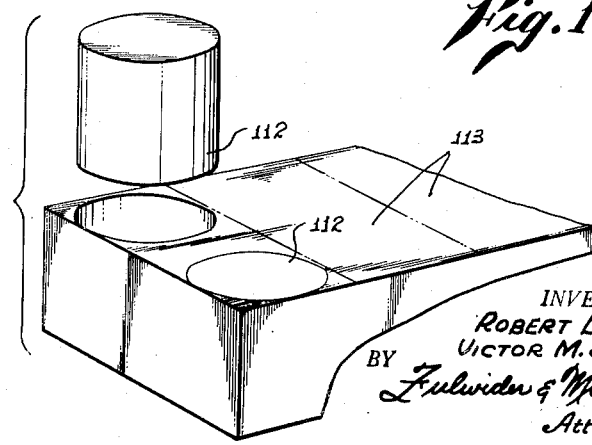
Fig. 10
INVENTORS
ROBERT L. NOLAND
VICTOR M. SANDERS
BY Fulwider & Mattingly
Attorneys United States Patent Office 2,767,436
Patented Oct. 23, 1956

2,767,436

METHODS OF FORMING SMOOTH SURFACES ON THERMOPLASTIC SPONGE

Robert L. Noland, Duarte, and Victor M. Sanders, Azusa, Calif., assignors, by direct and mesne assignments, of two-thirds to said Sanders and one-third to Harold J. Beck, Azusa, Calif.

Application August 25, 1952, Serial No. 306,078

5 Claims. (Cl. 18—55)

Our invention relates to a method for forming articles from thermoplastic sponge material.

It has for some time been the practice to make certain types of articles such as Christmas ornaments, display accessories and the like, from thermoplastic sponge materials such as the "foams" of polystyrene or cellulose acetate. These sponge materials greatly resemble solidified foam or froth, and are characterized by an extremely low density ranging from one to six pounds per cubic foot, depending upon the particular material. While the material is solid and stable at temperatures below 180° F., its extremely poor strength characteristics have limited its use to such applications as ornamentation and as heat insulation where no or little structural strength is required. The surface of a body of such material, like the body portion itself, is extremely porous, and consequently tends to become dirty and discolored very rapidly due to the collection of dust in the surface ports and the impossibility of cleaning once the dust has collected in such pores.

Prior to our invention, articles to be made from such thermoplastic sponge materials were merely cut or carved from stock material. This stock material is presently available as "lumber"; that is, in the form of planks or boards.

We have discovered a new process for forming articles from such thermoplastic sponge materials. Articles made by our new process retain the advantageous characteristics of the sponge material, i. e., extremely low density, distinctive appearance, excellent heat insulating qualities, but embody the new advantageous features of greatly increased strength characteristics, a smooth glossy impervious outer surface which does not tend to become dirty or discolored and which is readily cleaned, together with the outstanding advantage of producing readily and inexpensively shapes that are cut or carved only with great difficulty and at great cost.

It is an object of our invention to provide a method for forming articles from thermoplastic sponge materials, which articles are characterized by a low density, a smooth glossy surface, and much higher strength than the original sponge material from which they are formed.

It is also an object of our invention to provide a method of the character set forth in the preceding paragraph in which blanks cut from stock sponge material are then molded to the desired finished shape and form by the application of heat and pressure, as, for example, by means of heated separable dies.

It is another object of our invention to provide a method of the character set forth in the preceding paragraph in which the forming pressure does not exceed one hundred pounds per square inch, and in which the forming temperature lies within the range 180° F.–260° F.

It is an additional object of our invention to provide a method of the character set forth hereinbefore in which the article is cooled to 180° F. or lower before removal from the forming dies.

It is also an object of our invention to provide a method of forming articles from thermoplastic sponge materials which consists in applying to suitable blanks cut from stock sponge material heat and pressure, said heat and pressure being applied to the surface of said blank and being sufficient to soften and compact the surface portion of the material of said blank and displace it to conform to the desired final shape without either softening or displacing the bulk of the material comprising the main body of the blank, and then cooling the material below the softening temperature while holding it in such final shape.

It is another object of our invention to provide a method of the character set forth in the preceding paragraph which utilizes a plurality of separable dies and which consists in heating said dies to a temperature exceeding the softening temperature of the material, opening one of said dies and placing an appropriately shaped blank therein, applying pressure to said opened die until the same is closed, and then cooling said die to a temperature below said softening temperature, the described process being successively repeated with others of said dies while the first-mentioned die is cooling, opening said first-mentioned die and removing the finished article therefrom after said die and article have cooled to below said softening temperature, and then reheating said die while said process is being repeated as described.

It is still another object of our invention to produce an article of manufacture comprising a body of thermoplastic sponge material of a given composition enclosed by a surface layer of solid thermoplastic material of the same composition and integral with said body, said surface layer having greater strength than said body and presenting a smooth glossy exterior surface.

It is an additional object of our invention to produce an article of manufacture of the character set forth in the preceding paragraph and comprising a small solid scale model of a given aircraft constituted by a fuselage, empenage, and one or more wings suitably secured to each other, all of said parts being solid and each being characterized by a relatively dense, smooth outer portion encompassing a body of sponge material of low density, the scale of said model being less than one-tenth actual size and the weight of said model being sufficiently small to provide a low wing loading enabling said model to be self-sustaining in flight at speeds as low as twenty feet per second.

It is also an object of our invention to produce an article of manufacture comprising a cup and a closure therefor, each consisting of a body of thermoplastic sponge material of given composition encompassed by a surface layer of solid thermoplastic material of the same composition and integral with said body, said surface layer having greater strength than said body and presenting a smooth glossy exterior surface.

It is a still further object of our invention to produce an article of manufacture comprising a cup and a closure therefor as described in the preceding paragraph in which said cup and closure have cooperating screw threads formed of said surface layer material.

Other objects and advantages of our invention will be apparent from a consideration of the following specification, read in connection with the accompanying drawings, wherein:

Fig. 1 is a perspective view of a flying small-scale solid model of an existing aircraft constructed of parts formed according to our invention;

Fig. 2 is a cross-sectional view illustrating the construction of a separable die used to form the wing of the model shown in Fig. 1;

Fig. 3 is a diagrammatic view illustrating the manner in which the wing blank is cut from stock thermoplastic sponge material;

Fig. 4 is a diagrammatic representation of the various steps constituting the new forming process of our invention;

Fig. 5 is a perspective view illustrating the construction of a press suitable for use in carrying out the forming step of the method of our invention;

Fig. 6 is an enlarged fragmentary sectional view of a portion of the wing of the model illustrated in Fig. 1 and showing the internal structure of the material after it has been formed in accordance with our invention;

Fig. 7 is an exploded perspective view illustrating another article of manufacture made in accordance with our invention and constituting a cup and a screw closure therefor;

Fig. 8 is a sectional view illustrating the construction of one form of die which may be used to make the cup shown in Fig. 7;

Fig. 9 is a sectional view illustrating the construction of one form of die which may be used in forming the closure illustrated in Fig. 7; and Fig. 10 is a perspective view illustrating diagrammatically the manner in which blanks are cut from stock material for forming the cup and closure illustrated in Fig. 7.

We have discovered that by the method and apparatus of our invention thermoplastic sponge material may be readily formed to a desired shape and at the same time be given new and superior characteristics which greatly increase the utility of the articles so formed, and which in some cases permit the ready and inexpensive manufacture of certain types of articles which heretofore have either been impossible to make or so costly as to be prohibitive. For example, prior to our invention no one, except possibly at great cost, has been able to make a true scale flying model of existing aircraft at scales of one-tenth actual size or smaller.

The importance of both flying models and scale models of existing aircraft in the education of both adults and juveniles has long been recognized. Unfortunately, however, it has not previously been possible to make small scale flying models because the weight of such models greatly exceeds the scale weight, and the wing loading is so high that it is impossible to develop enough lift to make the model self-sustaining except at excessively high speeds. Our invention makes use of the extremely low density (as low as one or two pounds per cubic foot) of the thermoplastic sponge materials, provides a ready and inexpensive method and apparatus for forming such material to the desired shape of the various parts of the aircraft, imparts to such formed materials vastly improved strength characteristics allowing the parts to withstand the handling and sustain the shocks and loads to which they will be subjected, and allows a model to be assembled from such parts having such a low total weight that the model is capable of self-sustained flight at speeds as low as twenty feet per second.

Referring to the drawings, we have selected a true scale flying model airplane such as is shown in Fig. 1 as illustrative of an article heretofore impossible of construction, but which is readily and inexpensively produced by the method and apparatus of our invention. The model airplane shown in Fig. 1 may comprise four parts, to wit, a fuselage 20, a wing 21, and an empenage consisting of a vertical stabilizer 22 and a horizontal stabilizer 23. A canopy 24 may be simulated by appropriately shaping the fuselage 20, or if desired a separate part formed of thin transparent sheet material may be utilized. The individual parts may be secured to each other in the proper assembled relation by means of a suitable adhesive.

Since all of the parts of the airplane are formed by the same process and through use of the same or similar apparatus, we have chosen to illustrate and describe our invention as practiced in forming the wing 21.

The wing 21 is formed by means of a die such as illustrated in Fig. 2. The die comprises a female part 25 and a male part 26 adapted to be received within a recess 27 formed in the upper surface of the female part 25. The bottom surface 28 of the recess 27 and the lower surface 29 of the male die part 26 are excavated as indicated at 30 and 31, respectively, to define a die cavity of exactly the same shape and size as the finished wing 21 when the separable die parts 25 and 26 are closed as shown in Fig. 2.

The recess 27 is preferably made of greater width and length than the corresponding dimensions of the part to be formed therein so that the undisturbed portions of the lower surface 29 and the recess bottom 28 may act as positive stops to limit the closing movement of the die in the closed position as shown.

To facilitate insertion of the male part, the upper edge of the recess 27 is preferably beveled or chamfered slightly as is indicated at 32. Also, by preference, the upper surface of the male part 26 is provided with a shallow recess 33 for receiving the head or arbor of a suitable press described hereinafter and used to close the die during the forming operation.

We have illustrated in Fig. 3 the manner in which a suitable blank is cut from stock material. As is represented in Fig. 3, thermoplastic sponge materials of the character utilized in the practice of this invention are available as "lumber"—that is, in the form of planks or boards. To prepare the blank for the model airplane wing 21, a board 34 is selected having a thickness only slightly greater than the maximum thickness of the finished wing 21. By cutting the board 34 along cutting lines such as are represented at 35, a blank such as is shown at 36 is produced. This blank is given substantially the same length and width dimensions as the finished wing. The cutting of the stock material may be accomplished in substantially any desired manner, since the material may be readily worked with ordinary woodworking tools. However, in the interests of avoiding crushing of the relatively fragile material, a preference is expressed for the use of a hot wire as a cutting instrument, the hot wire being extended vertically and moved along the cutting lines 35. The cutting lines 35 may be first imprinted upon the surface of the board 24 as by use of a stencil, or the same result may be achieved through the use of appropriate guides and templates for guiding the movement of the cutting wire.

By the references made herein to thermoplastic sponge materials, we intend to define stock materials constituting solidified foams or froths of a "plastic" or synthetic resin of the thermoplastic type. As specific examples of materials included within the generic term "thermoplastic sponge material," reference is made to polystyrene foam manufactured and sold by the Dow Chemical Company under the trademark "Styrofoam" and cellulose acetate foam (sometimes referred to as expanded cellulose acetate) manufactured and sold by Strux Corp. under the trademark "Strux." Although not so readily available as the foams of polystyrene and cellulose acetate, the thermoplastic sponge materials referred to herein may comprise foams or froths of any of the thermoplastic synthetic resins such as cellulose nitrate, cellulose acetate butyrate, ethyl cellulose, methyl methacrylate, polyvinyl chloride, polyvinyl acetate, and copolymers of vinyl chloride and vinyl acetate, polyvinyl butyrol, polyethylene, and polyvinylidene chloride.

The method of our invention by which the blank 36 is formed to provide the wing 21 may be briefly described as consisting of the following steps and operations. The die parts 25 and 26 are first heated, and then the blank 36 is placed within the cavity or recess 27 in the female die part 25. The male die part 26 is placed on top of the blank 36, and a compressive force is applied between the two die parts tending to force the male die part into the female die cavity. This closing force is maintained until the die is completely closed, as is represented in Fig. 2.

When the die is completely closed, the closing force is removed and the die is cooled. After cooling, the die is opened and the finished part removed. The die parts may then be reheated preparatory to receiving a second blank 36 for forming a second wing 21.

The temepratures to which the die is heated preparatory to the forming operation and to which it is cooled following the forming operation, as well as the magnitude of the die-closing force and the time during which said force is applied, are all largely dependent upon the character of the thermoplastic sponge material from which the blank 36 is cut, and dependent also upon the form and character of the finished part. It may be stated generally, however, that prior to receiving the blank, the die parts are heated to a temperature in excess of the softening temperature of the thermoplastic sponge material, and that following the forming operation, the die is cooled to a temperature below the softening point of the material. During the forming operation, while the die-closing force is being applied, the displacement of the material into the final finished form of the article is accomplished primarily by melting or plastic deformation of the heated thermoplastic sponge material. In order for this to take place it is necessary that the die temperature exceed the softening temperature of the thermoplastic sponge material so that those parts of the material which are engaged by the surface of the heated die parts will be melted or rendered sufficiently plastic to permit the material to be displaced in accordance with the desired final shape of the article as defined by the cavity in the die. The upper limit of the die temperature is determined largely by the amount of deformation and displacement of material which must be accomplished to convert the blank into the final form of the article produced. The higher the die temperature, the more rapid the die closing. Also, higher die temperatures produce more actual melting of the thermoplastic material and less plastic deformation. The heat penetration into the interior of the blank is greater at higher temperatures, and a correspondingly greater volume of the sponge material is modified during the forming operation. The die, of course, must be cooled after the forming operation to a temperature below the softening temperature of the material in order that the finished article will retain its shape.

The closing force is applied to the separable die for such period of time as is required to move the die parts to a fully closed position. This time depends upon the temperature of the die parts as above explained, and depends also upon the distance the die parts must be moved to reach the closed position, and also upon the magnitude of the closing force.

It may be stated generally that the closing force applied to the separable die is kept sufficiently small to limit the compressive stresses in the body portion of the blank 36 to values less than the ultimate compressive strength of the thermoplastic sponge material. On the other hand, the die-closing force must be sufficiently high to displace to the appropriate new locations the material which has been rendered plastic or fluid by heating thereof through contact with the heated die surfaces.

More specifically, and by way of example only, polystyrene and cellulose acetate foams may be formed at die temperatures falling within the range of from 180° F. to 260° F. The forming pressures should lie between five and seventy-five pounds per square inch for the polystyrene foam materials, and between five and one hundred pounds per square inch for the cellulose actate foam materials, the forming pressure being understood to be the total die-closing force divided by the area of the blank normal to the direction of die-closing movement. We have found, for example, that the airplane wing 21 may be formed from polystyrene sponge material using dies heated to 210° F. and forming pressures of from five to ten pounds per square inch. The relatively low temperatures and pressures are made possible by the fact that a relatively small amount of deformation is required to convert the blank 36 into the finished shape of the wing 21.

Other typical operating conditions are mentioned by way of example hereinafter in connection with the forming of the cup and closure illustrated in Fig. 7.

We have found that various articles may be formed very rapidly and inexpensively by the above-described method through the use of a semi-continuous repetitive type of process such as is diagrammatically represented in Fig. 4. In carrying out this process, it will be understood that a relatively large number of identical dies are employed. These dies are all placed within an oven or are otherwise heated to the desired forming temperature at a heating station represented by the rectangle 40. It will be understood that the way in which the dies are heated is not important insofar as the forming process itself is concerned. The dies may be heated by convection in an appropriately designed and controlled oven, or they may be heated by radiation from suitably controlled sources of infrared. If desired, the dies may be heated by induction, or they may be so constructed as to include self-contained heating elements, either in the form of electrical heating elements or in the form of passages or conduits for receiving a heated fluid such as live steam.

When the dies have been heated to the forming temperature, they are taken from the heating station 40 in succession, being moved one at a time as indicated at 41 to a loading station 42 where the die is opened and charged with a blank taken as indicated at 43 from a suitable supply 44 of pre-cut blanks. The loaded die is moved as represented at 45 to a pressing station 46, where the closing force is applied to the die for a sufficient length of time to complete the forming operation.

At the completion of the forming operation, the dies are moved as indicated at 47 to a cooling station 48 where the dies remain for a sufficient length of time to reduce the temperature thereof to the required lower temperature.

Cooling of the dies may be accomplished in any one of a number of suitable ways. We have found, for example, that subjecting each die to a cooling blast of air serves to reduce its temperature quite rapidly to the required lower value.

As the dies are successively cooled, they are moved as indicated at 49 to an unloading station 50 where the dies are opened and the finished product removed, the finished product being transported as represented at 51 to an assembly station or packing station, depending upon the nature and character of the finished article.

The unloaded dies are moved as indicated at 51' to the die-heating station 40, where they are again heated to the required forming temperature.

By using an appropriate number of dies, it is possible to move the dies in relatively rapid succession through each of the loading, pressing, and unloading stations, while moving the dies relatively slowly through the cooling and heating stations so as to keep the dies at those stations for a sufficient length of time to accomplish the required change in die temperature. In this way, the formed articles can be produced very rapidly and at relatively low cost.

Because of the low forming pressures employed and the relatively low temperatures at which the dies are operated, it is possible to use dies of relatively inexpensive construction. In this connection it is pointed out that the accompanying drawings are not necessarily to scale, nor are they intended to represent by their proportions the thicknesses of the various die parts. In most cases the thicknesses have been exaggerated in the drawings for the purpose of clarifying the details of construction. We have found, for example, that an airplane wing such as is illustrated at 21 in Fig. 1 may be satisfactorily formed in a die fabricated from sheet aluminum alloy having a thickness of only 0.08 inch. Where possible, such a construction is preferred because it greatly reduces the cost of manufacturing the die itself and shortens greatly the time required to heat and cool the die.

The die-closing force may conveniently be applied by means of a pneumatic arbor press such as is illustrated in Fig. 5. The press there shown comprises a table or lower platen 60 upon which the die is placed. The position of the die on the table may be indexed by means of index pins 61 or like suitable guides. A standard 62 secured to the table 60 serves to support a pneumatic cylinder 63, the ram 64 of which is positioned above the table 60 so as to exert a downward force upon the upper part of a die placed on the table 60.

Reciprocation of the ram 64 may be controlled by a suitable four-way valve 65 arranged to connect a conduit 66 carrying compressed air to branch conduits 67 and 68 leading to opposite ends of the pneumatic cylinder 63.

Preferably the conduit 66 is connected through a conventional pressure regulator illustrated at 69 to a suitable connection means 70 allowing the regulator 69 to be connected to a source of compressed air. The conduit 66 may also be connected to a pressure gauge 71 for indicating the pneumatic pressure in the conduit 66 and permit appropriate adjustment of the regulator 69.

With a press constructed as described, the regulator 69 may be adjusted to cause the ram 64 to exert substantially any selected predetermined force upon the upper die member placed beneath the ram. Once the pressure is set by appropriate adjustment of the regulator 69, the pneumatic cylinder may be used to apply the die-closing force to the dies as they are fed to the press one after another by appropriate manipulation of the four-way valve 65, such manipulation being accomplished through the use of a suitable control such as the manual control lever 72 illustrated in Fig. 5.

The process of our invention provides an entirely new and different material from any heretofore used in formed articles. The nature and character of this material is represented in Fig. 6, which constitutes an enlarged fragmentary sectional view of the airplane wing 21. The material produced consists of a body portion represented generally by the reference character 75, which constitutes the original thermoplastic foam material without substantial change. This body is integrally joined to an outer skin 76 consisting of solid impervious thermoplastic material having a smooth, unbroken outer surface 77. The skin 76 constitutes the original thermoplastic sponge material from which the voids and interstices have been entirely eliminated by the melting or plastic deformation of the sponge material brought about by the application of heat and pressure thereto during the forming operation.

The skin 76 not only provides a smooth, hard, unbroken outer surface on the finished article, but adds tremendously to the strength of the product. From a structural standpoint, it will be seen that the skin 75 constitutes the outer "fibers" of the article, and is therefore so located as to employ to the maximum benefit the greater strength of the compacted skin 76. The tremendous increase in strength will be appreciated from the fact that the impact strength of the skin is 150 times that of the sponge material, its tensile strength is 200 times that of the sponge material, its compressive strength is 1300 times that of the sponge material, and its density is only 50 times that of the sponge material. Because of the placement of the skin where, structurally speaking, its increased strength serves most effectively, and because of the vastly increased strength of the skin material as compared with the body material, it is possible to impart relatively great strength to the finished article with a skin thickness of only a few thousandths of an inch.

As stated, the skin 76 is an integral part of the formed article, being integrally joined to the body portion 75. Between the body portion 75 and the skin proper there is a relatively narrow zone of partially modified sponge material. This zone is represented diagrammatically and generally in Fig. 6 by the reference character 78, and is characterized by a relatively uniform and rapid transition from the completely undisturbed material comprising the body 75 through a steadily increasing degree of consolidation until the completely consolidated and compacted skin 76 is reached.

The thickness of the skin 76 is dependent upon how nearly the shape of the finished article is approximated by the blank, and also by the ratio of the volume of the blank to the volume of the finished article. The thickness of the transition layer 78 is believed to be largely a function of the die temperature and the forming time. The higher the temperature and the longer the forming time, the greater depth to which the sponge material will be heated to a temperature exceeding its softening temperature.

We have chosen for illustration in Fig. 7 a cup 80 and closure 81 therefor as an example of an article which may be so produced by the method and apparatus of our invention as to provide characteristics and properties superior to those of like articles made by other processes. The cup and closure 80, 81 is designed particularly for use as an "igniter cup" such as is often used in ordnance. In certain types of ordnance, such igniter cups being filled with an igniter or explosive material and employed to set off the main charge, are destroyed when the piece is fired. For various reasons which will be apparent to those skilled in the ordnance art, it is highly desirable that the igniter cup be completely destroyed, either by vaporization or by reduction to fragments of minute size. This desideratum has not been realized with igniter cups heretofore manufactured by processes and of materials other than those constituting the present invention, whereas igniter cups manufactured according to the present invention appear to be either completely vaporized or reduced to fragments and particles of such small size that the cup may be said to be completely and utterly destroyed when the ordnance piece is fired.

The igniter cup and closure which is produced by the practice of our invention constitutes a cup-like member such as is shown at 80 in Fig. 7 characterized by a bottom wall 82 and tapered cylindrical side walls 83. The upper portion of the cavity 84 thus formed is provided with a screw thread 85 for receiving corresponding screw threads 86 formed on the peripheral cylindrical surface of the thin disk-like closure 81. The upper surface of the closure 81 preferably has formed therein a pair of circular depressions or sockets 87 permitting a spanner to be used for screwing the closure 81 in place.

We have illustrated in Fig. 8 a form of die which may be used to form the cup 80. The die comprises an outer or female die part 90 provided with a die cavity 91 having the same shape as the exterior shape of the igniter cup 80. A male die member 92 having an exterior shape conforming to the interior surface contour of the cup 80, including the screw threads 85 which are formed by like threads 93 provided on the upper die member 92, is received within the die cavity 91. An upper cylindrical portion 94 of the male die member may be slidably received within an upper cylindrical recess 95 in the female die part to guide and center the male die part in the die cavity 91. Interengaging lands 96 serve to limit the downward movement of the upper die part relative to the lower die part.

The upper die part may be provided with a socket 97 for receiving the head of the press, and is also preferably provided with a screwdriver slot 98 to permit the male die part to be unscrewed and thus removed from the cup 80 at the conclusion of the forming operation.

A die for forming the closure 81 is illustrated in Fig. 9. The male die member constitutes a flat disk 100 provided with a recess 101 for receiving the head of the press and carrying suitable pins 102 protruding below the undersurface of the disk 100 for the purpose of forming the spanner sockets 87. The upper die member 100 is received within a cylindrical recess 103 formed in the upper part of the lower die member indicated generally at 104, interengaging lands 105 serving to limit downward movement of the upper die member. The lower die member provides a die cavity 106 surrounded by a threaded portion 107 for forming the male threads 86 on the closure 81.

While the lower die member 104 may be made by a one-piece construction similar to that illustrated in Fig. 8, manufacturing convenience is served, particularly in the machining of the threads 107, by forming the lower die member 104 in two parts; i. e., an inner part 108 constituting a ring-like member carrying an external male thread 109, and a lower closure member 110 provided with an upstanding side wall 111 and appropriately threaded to receive the threads 109.

In Fig. 10 we have illustrated diagrammatically the preparation of blanks suitable for forming the cup 80 and the closure 81, such a blank being shown at 112 in Fig. 10 as constituting a right circular cylinder cut by means of a hot wire or a ring cutter from a plank 113 of thermoplastic sponge material, the axial length of the blank 112 being the same as the thickness of the board 113.

In cutting blanks for the cup 80, a board 113 having a thickness only slightly greater than the height of the cup 80 is selected, whereas in cutting blanks for the closure 81, a board 113 having a thickness only slightly greater than the thickness of the closure 81 is selected. The blank for the cup 80 is given a diameter substantially equal to the maximum outside diameter of the cup, whereas the blank for the closure 81 is given a diameter substantially equal to the outside diameter of the closure.

We have found that by appropriately selecting the dimensions of the blanks, the temperature of the dies, and the forming pressure applied, it is possible to readily form cups and closures 80, 81 in which the threads 85 and 86 are formed entirely of the fully compacted material such as is represented by the skin 76 shown in Fig. 6. The forming of the cup 80 is representative of forming operations wherein a substantial deformation of the material is caused to take place—that is, the case wherein the shape of the finished article differs rather widely from the shape of the blank from which it is formed. In such cases, higher forming temperatures and pressures are required. For example, in forming the cup 80 we have obtained excellent results with polystyrene foam material using a forming temperature of around 260° F. and forming pressures approaching the ultimate compressive strength of the material. This causes a greater degree of compaction of the material, particularly in the forming of the bottom wall 82, and results in the melting of a larger amount of material such as is required for forming the threads 85 and 86. Also, because of the greater amount of deformation and the longer distance through which the die parts must be relatively moved in order to completely close the die, a considerably longer time is required for carrying out the forming operation. In the case of the cup 80, we have found that the closing force must be applied for approximately fifteen seconds in order to complete the closing of the die. During this entire time the material in the region of the threads 85 is being subjected to the heat of the male die member, with the result that a considerable amount of the material in the region of the threads 85 is completely melted to form the solid thread as is desired. In this connection, we have found that the male die part 92 may be removed from the cup 80 and that the closure 81 may be readily removed from the lower die part 105 merely by unscrewing the male parts through use of the screwdriver slot 98 and the spanner sockets 87, respectively.

From the foregoing it will be observed that we have provided a new method for forming articles from thermoplastic sponge materials, and that we have also provided an entirely new and different type of formed article characterized particularly by a central body portion consisting of the thermoplastic sponge material which is enclosed by a surface layer of solid thermoplastic material of the same composition as the sponge material and constituting an integral part of the article.

Attention is directed particularly to the fact that our invention utilizes to the utmost the advantageous and desirable properties of such thermoplastic sponge materials, i. e., low density, distinctive appearance, and excellent heat and electrical insulating qualities, and at the same time provides as an integral part of the formed article an outer skin which not only provides a hard, smooth, unbroken outer surface, but which increases the strength of the article many times over the strength the article would have if such a skin were not provided.

Attention is also directed to the simplicity of the method of our invention and to the simple and inexpensive construction of the apparatus used in the practice of the method. As has been pointed out, it is possible by utilization of the method and apparatus disclosed herein to manufacture many articles which have heretofore been impossible of manufacture and to manufacture articles exhibiting vastly improved properties and characteristics, all at exceedingly low cost and at an extremely rapid rate.

While we have selected for illustration and have described herein certain preferred embodiments of our invention, the same is not to be limited to the details shown and described, except as defined in the appended claims.

We claim:

1. The method of forming articles from a blank of thermoplastic sponge material which consists in heating to a temperature exceeding the softening temperature of said material a separable die defining when closed a die cavity conforming in shape to the shape of said article, placing said blank in said cavity, said blank having a shape generally similar to the shape of said cavity and having a volume substantially equal to the volume of said cavity, applying to said die a closing force less than that required to exceed the compressive strength of said material at ambient temperatures and maintaining said closing force until said die is closed, immediately cooling said die to a temperature less than said softening temperature, and then opening said die and removing said article therefrom.

2. The method of forming articles from a blank of thermoplastic sponge material of the group consisting of polystyrene foam and cellulose acetate foam which consists in heating to a temperature of from 180° F. to 260° F. a separable die defining when closed a die cavity conforming in shape to the shape of said article, placing said blank in said cavity, said blank having a shape generally similar to the shape of said cavity and having a volume substantially equal to the volume of said cavity, applying to said die a closing force of from five to one hundred pounds per square inch and less than that required to exceed the compressive strength of said material at ambient temperatures until said die is closed, immediately cooling said die to a temperature less than 180° F., and then opening said die and removing said article therefrom.

3. The method of forming articles from a blank of polystyrene foam which consists in heating to a temperature of from 180° F. to 260° F. a separable die defining when closed a die cavity conforming in shape to the shape of said article, placing said blank in said cavity, said blank having a shape generally similar to the shape of said cavity and having a volume substantially equal to the volume of said cavity, applying to said die a closing force of from five to seventy-five pounds per square inch and less than that required to exceed the compressive strength of said form at ambient temperatures until said die is closed, immediately cooling said die to a temperature less than 180° F., and then opening said die and removing said article therefrom.

4. The method of forming articles from a blank of cellulose acetate foam which consists in heating to a temperature of from 180° F. to 260° F. a separable die defining when closed a die cavity conforming in shape to the shape of said article, placing said blank in said cavity, said blank having a shape generally similar to the shape of said cavity and having a volume substantially equal to the volume of said cavity, applying to said die a closing force of from five to one hundred pounds per square inch and less than that required to exceed the compressive strength of said foam at ambient temperatures until said die is closed, immediately cooling said die to a temperature less than 180° F., and then opening said die and removing said article therefrom.

5. The method of forming thermoplastic sponge articles having smooth glossy surfaces which comprises placing a shaped body of a thermoplastic sponge material in a die having a cavity with surfaces heated to a temperature in excess of the softening temperature of said material, said cavity having a shape and volume approximately the same as that of said shaped body, exerting a compressive force between the surfaces of said shaped body and the surfaces of said cavity, said compressive force being less than required to exceed the compressive strength of said shaped body at ambient temperatures, maintaining said compressive force until the surfaces of said shaped body are smooth and glossy, immediately thereafter cooling the surfaces of said cavity to a temperature lower than said softening temperature and removing said shaped body from said cavity.

References Cited in the file of this patent
UNITED STATES PATENTS

| | | |
|---|---|---|
| 926,951 | Taylor | Oct. 2, 1894 |
| 984,508 | Chandler | Feb. 14, 1911 |
| 2,023,204 | Munters et al. | Dec. 3, 1935 |
| 2,228,614 | Soubier et al. | Jan. 14, 1941 |
| 2,256,483 | Johnston | Sept. 23, 1941 |
| 2,363,508 | Doster et al. | Nov. 28, 1944 |
| 2,384,387 | Meyer | Sept. 4, 1945 |
| 2,405,345 | Cooper et al. | Aug. 6, 1946 |
| 2,442,940 | Staudinger et al. | June 8, 1948 |
| 2,484,397 | Barton | Oct. 11, 1949 |